United States Patent [19]

Rickert et al.

[11] Patent Number: 4,603,363
[45] Date of Patent: Jul. 29, 1986

[54] STOP MECHANISM USING AN ELASTOMERIC ELEMENT

[75] Inventors: David Rickert, Boulder; Miklos B. Marelin, Longmont, both of Colo.

[73] Assignee: Storage Technology Partners II, Louisville, Colo.

[21] Appl. No.: 471,369

[22] Filed: Mar. 1, 1983

[51] Int. Cl.⁴ .................. G11B 5/012; F16F 7/10; F16F 1/36
[52] U.S. Cl. .................................. 360/97; 188/379; 267/153
[58] Field of Search .............. 360/97, 98, 99, 105, 360/109, 137; 188/379, 266, 268; 267/136, 153

[56] References Cited

U.S. PATENT DOCUMENTS 2,668,049  2/1954  Taylor ......................... 267/153
3,643,242  2/1972  Bryer ........................... 360/98

FOREIGN PATENT DOCUMENTS 1550862  12/1968  France ......................... 188/379

Primary Examiner—John H. Wolff
Assistant Examiner—Andrew L. Sniezek
Attorney, Agent, or Firm—Woodcock Washburn Kurtz Mackiewicz & Norris

[57] ABSTRACT

A soft-stop mechanism for the carriage of a rotating disk storage system is presented. The mechanism consists of an assembly which is affixed to a nonmoving member of the storage system and a protruding pin on the moving carriage. The assembly has a hole at one end which the pin enters when the carriage exceeds its normal length of travel. The pin first strikes a rubber plate, which eliminates any shock which might be caused by a metal-to-metal contact. The rubber plate is mounted on the end of a piston which moves due to the force of the pin and compresses a cylindrical elastomeric tube. The elastomeric tube can be preloaded to cause a soft stop in a shorter distance without damage to the carriage.

15 Claims, 4 Drawing Figures

STOP MECHANISM USING AN ELASTOMERIC ELEMENT

BACKGROUND OF THE INVENTION

This invention relates to stop mechanisms; and more particularly to a soft-stop mechanism for use on the read/write head carriage of a rotating disk storage system. Even more particularly, this invention relates to a soft-stop mechanism that uses a preloaded elastomeric tube; is self centering; is easily adjustable; eliminates the need for bonding agents during manufacture; and prevents movement of the carriage, other than in its normal direction of movement, while stopping the carriage.

In a rotating disk storage system, a carriage mechanism moves the read/write heads radially over the surface of the disk. The radial movement of the carriage is controlled by a servo controller that positions the heads over the desired track in order to perform the read or write function. The overall movement of the carriage, in either direction, during normal operation is less than the total mechanical movement possible for the carriage.

Unfortunately, it is possible for an electrical failure, in the servo controller or related circuitry to cause the carriage to move at full speed in either direction of travel. If this occurs, and some mechanism is not provided to stop the carriage during such a failure, the carriage will "crash" into the mechanical limit of its travel. Such a crash may not only seriously damage the carriage mechanism, it may also cause the read/write heads, which are positioned very close to the disk surface (on the order of a micrometer for a magnetic disk system, and on the order of a millimeter for an optical disk system) to strike the disk surface, thereby causing damage to both the heads and the disk surface.

Although such electrical failures seldom happen, it is a universal practice in the art to provide a soft stop at each end of the carriage travel. A soft stop can be defined as a mechanism which cushions the carriage at the end of its mechanical travel, bringing it to a stop without imparting a shock sufficient to cause damage to the carriage, heads, or disk surface. Further, a soft stop is sometimes provided on each side of the carriage, at both ends of travel, to prevent the carriage from twisting as it is stopped.

In addition to a soft stop, it is also a universal practice to provide a hard stop at each end of travel. A hard stop can be defined as a mechanical stop that the carriage will hit if the cushioning effect of the soft stop is not sufficient to stop the movement of the carriage. A carriage seldom hits the hard stop; but if it does, proper design practice dictates that both the soft and hard stops prevent a damaging shock from being transmitted to the carriage. As in the case for soft stops, a hard stop is usually provided on each side of the carriage, at each end of travel.

In the prior art, soft stops typically consist of an elastomeric pad or a helical spring upon which a mechanical section of the carriage impinges. Hard stops are typically a fixed piece of metal upon which a mechanical section of the carriage impinges after compressing the soft stop.

Both elastomeric pads and helical springs, when used as soft stops, have disadvantages. Elastomeric pads are typically bonded in place during manufacture with a bonding agent. This process is not only time consuming (a sufficient curing time must elapse for the bonding agent to cure) but it is not totally reliable. That is, the pad may fall off some time after installation because of a poor bonding technique. Since the pad is in the interior of the disk system, its absence may never be noticed until a failure causes a catastrophic crash.

Helical springs can be bulky and are generally constrained so that they compress in the direction of motion of the carriage. If they are not constrained, they may bow out of the direction of travel and not provide the anticipated compression force. If they are constrained, the constraining mechanism may jam the spring such that it does not return to its relaxed position after use, making it inoperative for the next crash which might occur.

Disadvantageously, neither of the prior art soft stop methods discussed above prevent the carriage from leaving its normal line of motion while a soft stop is occurring. Hence, during a soft stop it is also possible for the carriage to move in a direction perpendicular to the disk surface, thereby causing damage to both the heads and the disk. Also, it is difficult in the prior art to adjust the hard stops so that they stop the carriage only after the full compression of the soft stop has occurred.

Thus, there is a need in the art for an improved soft-stop mechanism. The present invention addresses that need.

SUMMARY OF THE INVENTION

It is an object of the present invention to provide an improved soft and hard-stop mechanism for the carriage of a rotating disk storage system.

It is a further object of the present invention to provide such a mechanism that is easily aligned, provides limited sideways motion of the carriage during a stop, provides easy adjustment of the hard stop, and eliminates the need for the use of a bonding agent during manufacture.

The above and other objects of the present invention are realized through the use of a stop mechanism that comprises two principal assemblies or components. The first assembly, affixed to some nonmoveable portion of the disk system, has a guide hole in one end thereof. The second assembly comprises a specially configured pin mounted on the carriage. When a failure occurs, the pin of the second assembly enters the guide hole of the first assembly and pushes a piston housed within the first assembly. The piston compresses a preloaded tube of elastomeric material, thereby bringing the carriage to a soft stop. Should the failure be such that a hard stop is required, a tapered segment of the pin strikes a tapered section of the guide hole after the soft stop compression is expended. The amount of preload within the tubular elastomeric material, as well as the length of the pin can advantageously be adjusted to give the desired amount of soft stop force before a hard stop occurs.

The present invention provides for easy alignment and adjustment by allowing a partial first assembly to be loosely mounted on its mounting screws and aligned with the carriage mounted pin 10 by manually moving the carriage. The mounting screws are then tightened and the remaining parts are added to the first assembly. Advantageously, sideways motion of the carriage is limited by the use of the pin and mating hole in the assembly. If the mechanism of the present invention can not be mounted on the centerline of travel of the carriage, then separate mechanisms can be mounted on each side of the carriage in order to prevent the undesirable sideways motion.

BRIEF DESCRIPTION OF THE DRAWINGS

The above and other objects, features, and advantages of the present invention will be more apparent from the following more particular description of the preferred embodiment presented in connection with the following drawings, wherein.

DESCRIPTION OF THE PREFERRED EMBODIMENT

The following is a description of the best presently contemplated mode of carrying out the present invention. This description is given only to illustrate the general principles of the invention and is not to be taken in a limiting sense. The true scope of the invention can be ascertained by reading the appended claims.

Figure 1:
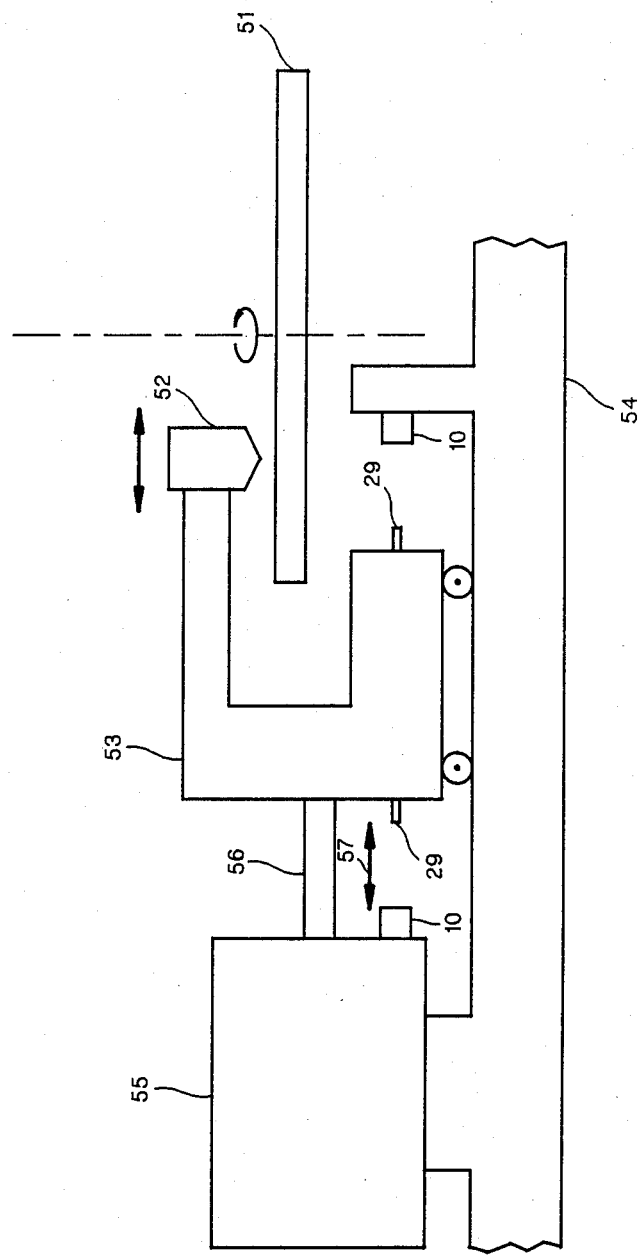
FIG. 1 is a simplified schematic representation of a rotating disk storage system, and depicts the environment in which the stop mechanism of the present invention is typically used.

FIG. 1 is a simplified schematic side view representation of a rotating disk storage system 50, and is shown to illustrate the environment in which the present invention would likely be used. A rotating disk 51 provides a medium on which data may be magnetically or optically stored. A read/write head 52 is mounted to a carriage assembly 53. The carriage assembly 53, in turn, is mounted for movement on a base plate or frame 54 of the disk storage system. The carriage is typically moved by a linear actuator (such as a voice coil motor) 55 that connects a shaft 56 thereof to the carriage assembly 53. The shaft 56 is moved linearly in the direction indicated by the arrow 57, thereby moving the read/write head 52 radially with respect to the disk 51. This radial movement provides access to desired tracks or bands on the disk.

The schematic representation of FIG. 1 is only illustrative of the principal components used in a typical rotating disk storage system. Numerous embodiments could be and are used to realize the desired function of moving a carriage assembly so as to selectively position a read/write head with respect to a rotating disk. As discussed previously, all such systems employ some soft-stop mechanism to mechanically limit the movement of the carriage. The present invention is directed to such a mechanism.

The stop mechanism of the present invention comprises two principal components. A protruding pin 29 affixed to the movable carriage 53 comprises one of these components. A shock absorbing element or assembly 10, affixed to the base plate or frame 54, comprises the other. The description that follows describes these two components in greater detail.

The pin 29 is preferably circular and has a front taper 32, a first diameter 30, a second taper 33 and a second diameter 31. The first diameter 30 is slightly smaller than the guide hole 14 in the front plate 13.

As described previously, the assembly 10 is fixed in position, and the pin 29 moves with the carriage in the directions shown by the arrow 34. Under normal operating conditions the pin 29 does not touch the assembly 10. However, in the event of a failure requiring a soft stop, the pin 29 enters the guide hole 14. The tapered edges 15 and 32 insure the pin 29 will enter the guide hole 14 without any interference.

Figure 2:
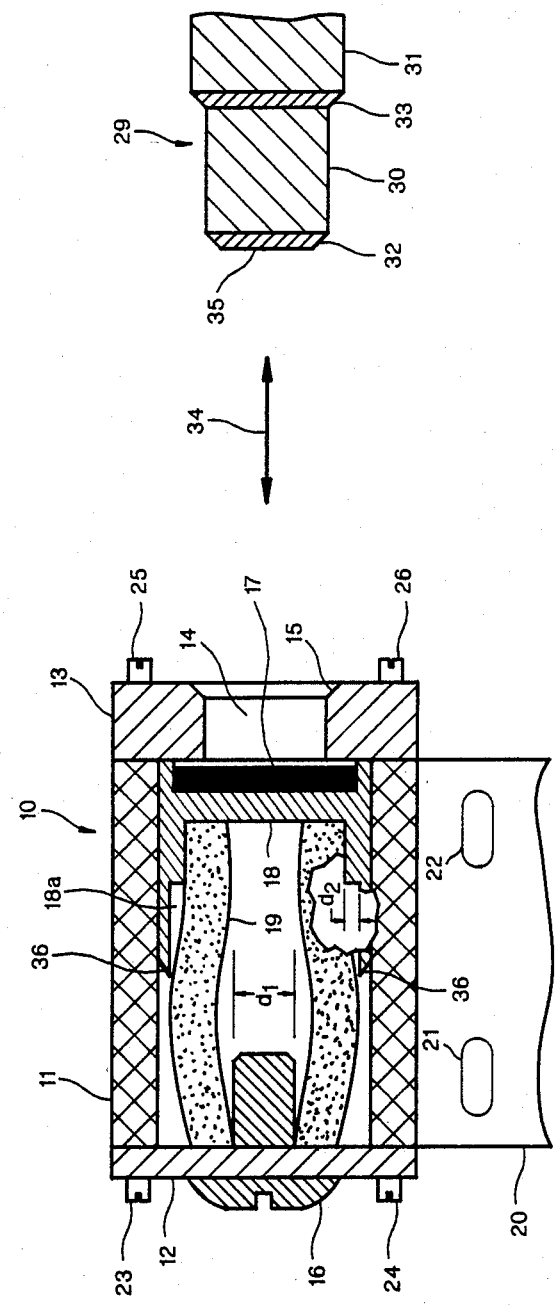
FIG. 2 is a cross sectional drawing showing the components of the present invention a portion of which is cutaway for clarity.

When the front surface 35 of the pin 29 passes through the guide hole 14, it strikes the rubber plate 17. The rubber plate 17 absorbs the initial contact shock and eliminates the sharp shock that would be transmitted to the carriage if the initial contact were metal hitting on metal. As the pin 29 moves further into the assembly 10, the piston 18 is pushed inward (to the left in FIG. 2), compressing the elastomeric tube 19. As the tube 19 compresses, it bows further into the interior of the housing 11, and absorbs the energy of the carriage, bringing it to a soft stop.

Further, compression of the tube 19 causes the outside diameter of the tube 19 to contact the undercut section 18a of the rearwardly extending side wall 36 of the piston 18. As will be explained hereinafter, by selectively designing this undercut section, the force versus deflection characteristics of the tube 19 may be desirably shaped. If a hard stop is required, the pin 29 moves into the guide hole 14 until the tapered edge 33 meets the tapered edge 15.

Figure 3:
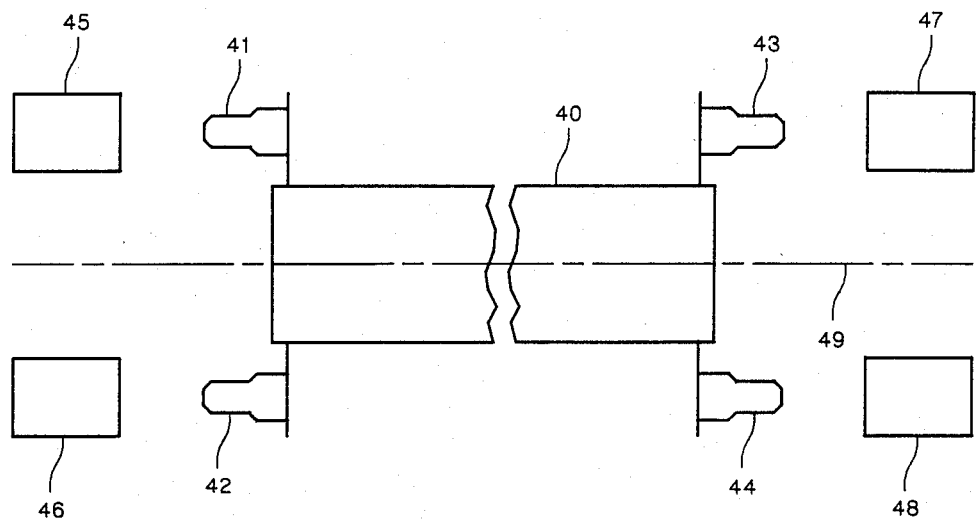
FIG. 3 is a simplified top plan view showing how the invention could be used.

FIG. 3 is a top plan view sketch showing how the present invention might be used. The carriage, represented by the rectangle 40, has up to four circular pins 41–44 mounted thereon. These pins are each the same as the pin 29 shown in FIG. 2. If a mechanical stop is needed, the pins 41 and 42, or 43 and 44, enter the respective assemblies 45 and 46, or 47 and 48, depending upon the direction of travel. In the example shown, two soft stops are used at each end, one on either side of the centerline of travel 49 of the carriage 40. This will prevent any sideways motion of the carriage as it is brought to a soft stop. A unique feature of the present invention is that if the soft stops can be mounted on the centerline of travel of the carriage, then only one soft stop is required at each end since the close fit between the first diameter 30 and the guide hole 14 (see FIG. 2) prevents any sideways motion.

Figure 4:
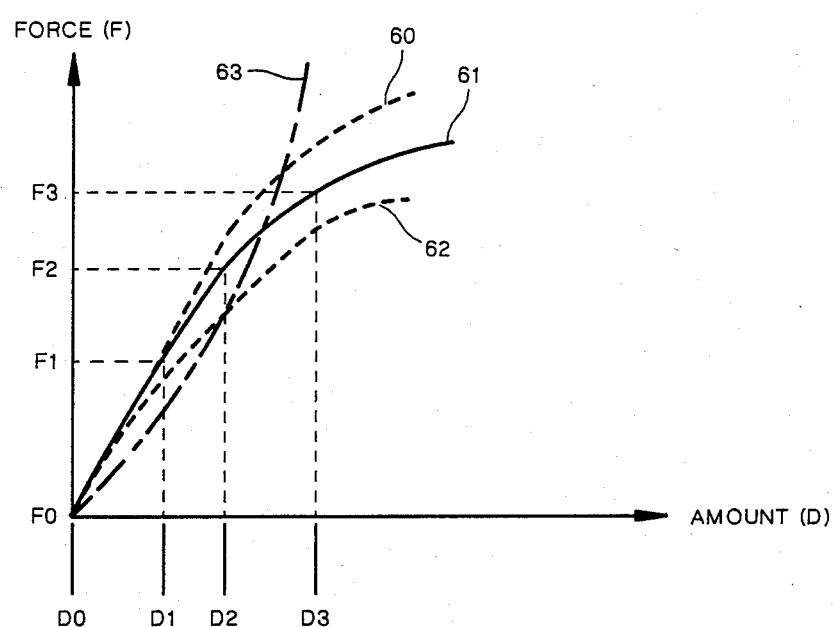
FIG. 4 is a graph showing typical force versus. distance characteristics associated with the elastomeric used with the present invention.

Another unique feature of the invention is the preload that is applied to the elastomeric tube 19. This is illustrated in FIG. 4, which shows the force (F) necessary to compress the elastomeric tube 19 a given distance (D). If the elastomeric tube 19 is installed in the assembly 10 with no preload, then the amount of compression is D0 and the initial force against the piston 18 is F0. If the pin 29 moves the piston 18 an amount D1, the elastomeric tube 19 will oppose the movement with a final force of F1. However, this may not be enough to absorb all the energy of the carriage. If this is the case, the elastomeric tube 19 can be preloaded, either by making it longer or by shortening the length of the housing 11. For example, if the tube 19 is preloaded an amount D2, the tube 19 then opposes any movement of the piston 18 with an initial force F2. When the pin 29 moves the piston the distance D3-D2 (which is equal to the distance D1 of the first example), the elastomeric tube 19 opposes the movement with a final force of F3. Thus, by allowing the preload to be adjusted, the soft stop can be adjusted to meet the requirements of the disk system on which it will be used.

Additional modification of the design can be made by changing the length of the pin 29 and the shape of the undercut area 18a. That is, it is possible, by selectively controlling the inner diameter $d_1$, of the tube 19 (in relation to the tube's length and outside diameter), to control the softening characteristics of the elastomeric material as shown by the family of curves 60–62 in FIG. 4. Similarly, by controlling the clearance $d_2$ (the size of the undercut area), the shape of the curves can be changed from a softening characteristic to a hardening characteristic, as shown by the curve 63. Thus, a great deal of design flexibility exists for imparting a desired characteristic to the elastomer used.

Any suitable elastomeric tubular material could be used with the present invention. For example, in the preferred embodiment, a type of polyurethane, identified as REN RP-6401, purchased from REN Plastics can be mixed and molded to the desired tubular shape. This particular elastomer has a Shore hardness of A60.

An additional unique feature of the invention is the ease with which the stop mechanism can be aligned and the hard stop adjusted. This is done by mounting the assembly 10, without the back plate 12, elastomeric tube 19, and piston 18 in place, but not tightening the mounting screws against the mounting bracket 20. The carriage is then manually moved to the point at which a hard stop should occur. As the pin 29 enters the guide hole 14, the assembly 10 is automatically aligned with the pin 29. The hard stop is adjusted by moving the assembly 10 until the tapered edge 15 just touches the tapered edge 33. The mounting screws are then tightened, the back plate 12, elastomeric tube 19, and piston 18 installed, and the soft stop is ready for use.

We claim:

1. An improved shock absorber assembly for minimizing the impact of a movable member against a stationary member, said shock absorber assembly comprising:
   a protruding pin affixed to either said movable member or said stationary member; and
   a piston assembly affixed to the other of said movable member or stationary member and aligned thereon so as to allow said protruding pin to make contact therewith whenever said movable assembly is about to strike said stationary member, said piston assembly comprising
   a hollow housing having a front end thereof having a hole adapted to receive said protruding pin and a back end,
   a piston mounted for movement inside of said housing, a head of said piston facing said hole,
   an elastomeric tubular element inserted inside of said housing and positioned between a back side of said piston head and said back end of said housing, said elastomeric element normally having an inner space extending substantially from said front end to said back end,
   said piston having means for bowing said elastomeric element into the interior of said housing, whereby said piston is forced back against said elastomeric element whenever said pin enters said hole, and strikes the head of said piston, said elastomeric element opposing the inward movement of said piston by a force that increases as the compression of said elastomeric increases, thereby softly absorbing the force associated with the impact of said movable member against said stationary member.

2. The improved assembly of claim 1 further including a hard rubber plate positioned between said piston head and said housing hole, whereby the pin entering said hole first strikes said hard rubber plate.

3. The improved assembly of claim 1 wherein said elastomeric element is loaded into said housing so as to be longitudinally compressed a known or determinable amount without said pin ever entering said hole, whereby said piston opposes the entrance of said pin into said hole with an initial force determined by the initial compression of said elastomeric element.

4. The improved assembly of claim 3 wherein said means for bowing comprises a side wall extending rearwardly from the periphery of said piston head, said side wall thereby forming a cavity on the back side of the piston head into which the first end of said elastomeric element is positioned.

5. The improved assembly of claim 4 wherein said side wall includes a selective change in the thickness thereof, said change in thickness occurring along an inside edge of said side wall, thereby creating an undercut section into which said tubular elastomeric element may expand as it is compressed, whereby the force versus compression characteristics of said tubular elastomeric element may be selectively controlled by varying the change in the thickness of said side wall.

6. The improved assembly of claim 1 wherein said pin and hole into which said pin is received are circular, said pin having a first diameter that is just slightly less than the diameter of said hole, thereby preventing lateral movement of said movable member as said pin engages with said hole, and further wherein said pin has a length that if inserted all the way into said hole allows a shoulder having a second diameter larger than the diameter of said hole to come in contact with the outside surface of the front end of said housing, thereby providing a hard stop to the further movement of said movable member.

7. The improved assembly of claim 6 wherein said hole includes a tapered surface adapted to mate with a tapered surface associated with the second diameter of said shoulder.

8. In a storage system having a carriage assembly that moves a read/write head radially with respect to a rotating disk, at least one soft-stop mechanism for preventing said carriage assembly from being damaged in the event said carriage assembly attempts to move beyond its normal operating range, said soft-stop mechanism comprising:
   a protruding pin rigidly coupled to said carriage assembly;
   a housing having a hole in a front end thereof, said housing being affixed to a stationary member associated with said storage system and being aligned with the movement of said carriage assembly such that said pin enters said hole whenever said carriage attempts to move beyond its normal operating range;
   a piston slideably mounted inside of said housing, said piston having a head facing said hole;
   an elastomeric element having a normally hollow interior positioned between a back side of said piston head and a back end of said housing, said element having an outside surface extending between said back side and said second end; and
   said piston comprising rearwardly extending side wall means for engaging said outside surface and compressing said elastomeric element toward the interior of said housing, whereby said elastomeric element is compressed by movement of said piston towards a back end of said housing, and whereby the compressive forces associated with said elastomeric element oppose the movement of said carriage whenever said pin enters the hole of said housing.

9. The soft-stop mechanism of claim 8 further including protection means for preventing said pin from directly contacting the head of said piston.

10. The soft-stop mechanism of claim 9 wherein said protection means comprises a hard rubber plate affixed to the head of said piston.

11. The soft-stop mechanism of claim 8 wherein said elastomeric element comprises a tubular elastomeric having a first end positioned against the back side of said piston head and a second end positioned against a fixed back wall of said housing.

12. The soft-stop mechanism of claim 11 wherein said side wall means includes a side wall extending rearwardly from the periphery of said piston head, said side wall thereby forming a cavity on the back side of said piston head into which the first end of said tubular elastomeric element is positioned.

13. The soft-stop mechanism of claim 8 wherein said side wall includes a selective change in the thickness thereof, said change in thickness occurring along an inside edge of said side wall, thereby creating an undercut section into which said tubular elastomeric element may expand as it is compressed, whereby the force versus compression characteristics of said tubular elastomeric element may be selectively controlled.

14. The soft-stop mechanism of claim 13 wherein said pin has a taper associated therewith, the cross sectional dimensions associated with said pin thereby preventing said pin from entering said hole beyond a fixed length, whereby said soft-stop mechanism functions as a hard-stop mechanism after the soft stop function has been provided for a fixed movement distance of said carriage assembly.

15. The improved assembly of claim 1, comprising two of said shock absorber assemblies positioned on respective sides of the centerline of travel of said moveable member.

* * * * *